Oct. 28, 1941.  F. G. RAWLING ET AL  2,260,640
METHOD OF TREATING SEEDS RICH IN PROTEIN
Filed Oct. 25, 1939
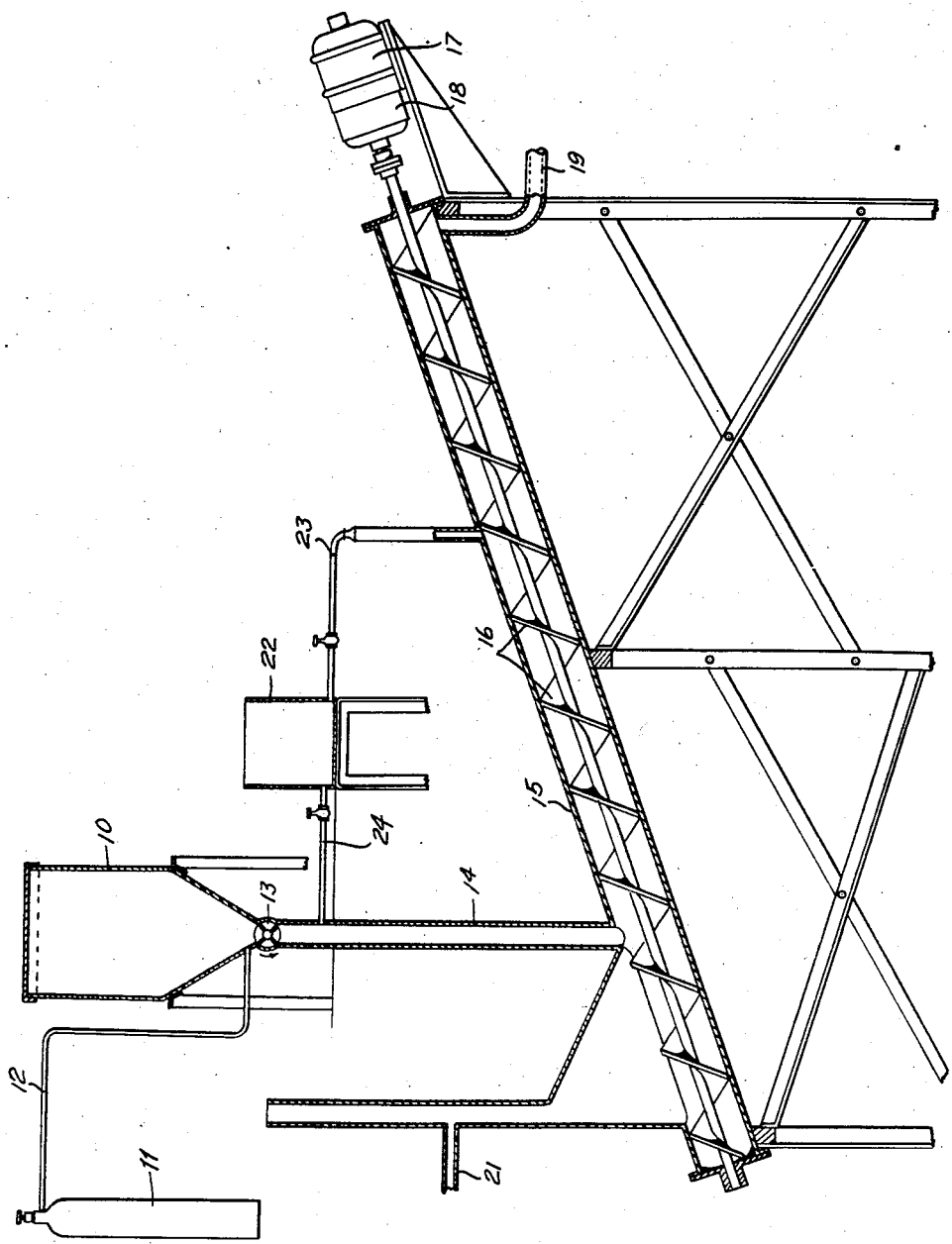

Patented Oct. 28, 1941

2,260,640

UNITED STATES PATENT OFFICE 2,260,640

METHOD OF TREATING SEEDS RICH IN PROTEIN

Francis G. Rawling and Wright M. Welton, Piedmont, W. Va., assignors to West Virginia Pulp and Paper Company, New York, N. Y., a corporation of Delaware Application October 25, 1939, Serial No. 301,196

9 Claims. (Cl. 260—112)

Our present invention relates to an improved process of extracting protein from seeds containing same for use for various purposes, an example of which is as an adhesive in coated paper manufacture.

Many attempts have been made to derive from soy beans, peanuts and other seeds a protein of a purity and strength which would be suitable as an adhesive in the manufacture of white coated paper. So far as we are aware, such attempts have been beset with the difficulties that the extract obtained is rather darkly colored or the yield has been unsatisfactory; and more especially the protein has been degraded unduly, with impairment of its adhesive properties. Further difficulties have been encountered by reason of the fact that it has usually been the practice to dry the protein, necessitating its solution in water in combination with a solubilizing agent such as an alkali or an acid before it can be used for coating paper.

It has also been proposed to separate the coloring matter from the seed meal prior to the extraction of the protein, by leaching the meal with a dilute acid of a pH around the isoelectric point, i. e., at which the protein is least soluble, after which the protein is dissolved from the so treated meal. However, in carrying out such a method the difficulty is presented that the meal to start with has an appreciable alkaline reaction, so that if the meal be treated directly with an acid solution having a pH value at the isoelectric point, e. g., 4.8 to 4.2, the pH of the solution will be rendered considerably less acid, because of the effect of this alkaline reaction in the meal, and a considerable loss of protein will result. On the other hand, if a more strongly acid solution be used so as to give a final value of pH in the mixture of acid and meal around the isoelectric point, the following action will occur: The acid solution of increased acidity will momentarily dissolve some of the protein. Later when the alkaline reaction of the meal becomes effective and an equilibrium is reached, the protein is reprecipitated; this precipitate, however, is in the form of a fine suspension which, instead of being left behind in the meal, is carried away with the acid solution, thus entailing a loss. While it is possible to recover some of the protein from the filtrate, the procedure involves considerable handling and manipulation and increases the cost of the process very substantially.

We have now discovered that this loss of protein can be avoided by first neutralizing the alkaline properties of the meal without dissolving the protein or causing it to be separated from the meal, so that when the meal is mixed with water it will yield a pH of around the isoelectric point, whereby no less of protein in the manner above described is had. The best way we have found of carrying out this preliminary neutralization is to treat the meal with a gas having an acid reaction, such for example, as sulfur dioxide or hydrogen chloride, preference being had for use of sulfur dioxide. However, other vapors having an acid reaction can be used, such as formic or acetic acids, it being necessary merely that the gas so used will upon reaction with water yield a pH, let us say, of 4.8 or lower. In carrying out the gassing step it is merely necessary to place the meal in a closed container and pass the gas therein until the requisite amount has been absorbed, such amount being determined either by testing a portion of the meal for pH, or until its weight has increased the calculated amount. Acetic acid or formic acid vapors may be conveniently formed by passing air or an inert gas through the liquid acid, preferably heated and the mixture of acid vapor and gas used for acidifying the meal in the same manner as sulfur dioxide or hydrochloric acid gas. Preferably the treatment is continued until the seed meal when mixed with water will give to the water a pH value in the range of from 4.8 to 4.2. If the treatment is stopped short of this range, i. e., higher than 4.8, benefit will be had to the extent that the potential alkaline effect of the meal is counteracted. If the meal is overgassed some loss of protein will also occur since the solubility increases after either limit of the range of pH of 4.8–4.2 is exceeded. Following the gassing step the meal is washed with an acid solution of around the isoelectric point to remove coloring matter from same, whereupon the protein is extracted by means of a suitable protein solvent.

Our invention will be best understood by reference to the following detailed example illustrative thereof, taken with the accompanying drawing, which shows diagrammatically one form of apparatus suitable for carrying out the gassing and the extraction of the meal with an acid solution.

100 pounds of preferably oil-free soy bean meal (the oil having been extracted in any suitable way as by solvent extraction) is placed in a container 10 and sulfur dioxide passed therethrough from tank 11 by means of pipe 12 until when a sample of the soy bean meal is removed and mixed with 10 times its weight of water, the water will have a pH in the range of 4.8 to 4.2. In the usual case 3.4 pounds of $SO_2$ added to the 100 pounds of the oil-free soy bean meal will yield a pH of 4.4, whereas 1.7 pounds of $SO_2$ will give a pH of 4.8. The so treated meal is then extracted with preferably a sulfurous acid solution of concentration at which the protein is least soluble, which we have determined to be in the range of pH=4.8 to 4.2. For this operation the meal is then fed from container 10 through rotary valve 13, chute 14 to extractor 15. The latter consists of an inclined tube in which is slowly rotated a spiral conveyor 16 by means of a motor 17 acting through gear reduction box 18. The extracted meal passes out through pipe 19 while the acid extract leaves through pipe 21. The acid solution is fed from tank 22 through pipes 23, 24 leading to separated points in the conveyor. The extract now contains in large part the coloring and mineral matter and carbohydrates from the meal so that the protein content of the thus treated meal will be raised from an initial figure of around 48% to a final value around 72%. The acid extract may be filtered and the non-soluble portion which is rich in protein added to the acid treated material. The thus purified and protein enriched meal to the amount now of around 67 pounds is then treated with a protein dissolving solution, preferably an aqueous solution containing 3 grams per litre of caustic soda or thereabouts, for which approximately 300 litres will be required. Or an aqueous acid solution of approximately 2.8 pH may be used as a solvent. The solution obtained containing around 45 pounds of soy bean protein is then clarified to remove finely divided cellular material by centrifuging or filtering or both.

The solution so obtained, concentrated by evaporation under vacuum if necessary, is suitable for various purposes for which soy bean protein, as well as casein, is customarily used. Such solution is particularly adapted for use as an adhesive and if necessary the concentrated solution may contain a suitable preservative. In the manufacture of paper coating compositions, it is merely necessary to add to the solution without previous concentration, clay, chalk, etc. The mixture is ground to the requisite consistency in a so called ink grinder or colloid mill or other apparatus of suitable type, such operation serving to mix intimately the protein solution with the pigment, and to disperse the latter in fine particles throughout the protein solution.

In lieu of the extracting device described above, many other known types of such apparatus may be used.

However, if it is desired to recover the protein as such, it may be precipitated by suitably adjusting the pH of the solution; but because such precipitation occasions a certain amount of degradation of the protein, with corresponding loss of adhesive power, such precipitation is to be avoided where possible.

Other acids may be used in the acid washing step instead of sulfurous, e. g., sulfuric, hydrochloric, etc. These acids may also be used as the protein solvent if desired. An acid which is a specific protein precipitant, such as molybdic acid, should of course not be used, or others which damage the protein, such as nitric acid.

While our invention has been described with reference to the recovery of protein from a substantially oil-free meal, it is of value where a soy bean preparation is sought containing the oil originally present.

This application is a continuation in part of our previously filed application Serial No. 126,149 filed February 17, 1937.

We claim:

1. In the treatment of seeds rich in protein that have an alkaline reaction in water, the steps of treating said seeds in divided form with a gas having an acid reaction in water sufficient to give a pH in the water of 4.8 or lower and then of washing the so treated seed material with an acid solution of a pH at which the protein thereof is relatively insoluble, to remove from said material coloring and other non-protein matters.

2. The method according to claim 1, in which the treatment of the seed material with gas is continued until the so treated material yields an acid reaction in water of approximately pH=4.8 to pH=4.2.

3. The method of concentrating the protein of seed meals rich in protein which meals have an alkaline reaction in water, which comprises treating the substantially oil-free meal with a gas having an acid reaction in water sufficient to give the pH of the water a value of 4.8 or lower, then washing the so treated meal with an acid solution of a pH at which the protein thereof is relatively insoluble, to remove from the meal coloring and other non-protein matters, and dissolving the protein from the so treated meal in a protein solvent.

4. The method according to claim 1, in which the gas used is sulfur dioxide.

5. The method according to claim 3, in which the gas used is sulfur dioxide.

6. In the treatment of soy beans, the steps of treating said beans in divided form with a gas having an acid reaction in water sufficient to give a pH in the water of 4.8 or lower and then of washing the so treated soy bean material with an acid solution of a pH at which the protein thereof is relatively insoluble, to remove from said material coloring and other non-protein matters.

7. The method of concentrating the protein of soy bean meal, which comprises treating the substantially oil-free meal with a gas having an acid reaction in water sufficient to give the pH of the water a value of 4.8 or lower, then washing the so treated meal with an acid solution of a pH at which the protein thereof is relatively insoluble, to remove from the meal coloring and other non-protein matters, and dissolving the protein from the so treated meal in a protein solvent.

8. The method according to claim 6, in which the gas used is sulfur dioxide.

9. The method according to claim 7, in which the gas used is sulfur dioxide.

FRANCIS G. RAWLING.
WRIGHT M. WELTON.